United States Patent
Burgermeister

(12) 
(10) Patent No.: US 11,146,184 B2
(45) Date of Patent: Oct. 12, 2021

(54) FREQUENCY CONVERTER WITH DRIVABLE SWITCH PREVENTING UNDESIRED CURRENT FLOW

(71) Applicant: Schmidhauser AG, Romanshorn (CH)

(72) Inventor: Andreas Burgermeister, Mauren (CH)

(73) Assignee: Schmidhauser AG, Romanshorn (CH)

( * ) Notice: Subject to any disclaimer, the term of this patent is extended or adjusted under 35 U.S.C. 154(b) by 0 days.

(21) Appl. No.: 16/869,917

(22) Filed: May 8, 2020

(65) Prior Publication Data

US 2020/0358371 A1 Nov. 12, 2020

(30) Foreign Application Priority Data

May 9, 2019 (DE) ..................... 10 2019 206 751.4

(51) Int. Cl.
*H02M 7/5387* (2007.01)
*H02M 1/08* (2006.01)
*H02P 27/06* (2006.01)
*H02M 1/00* (2006.01)

(52) U.S. Cl.
CPC ......... *H02M 7/53871* (2013.01); *H02M 1/08* (2013.01); *H02M 1/0009* (2021.05); *H02P 27/06* (2013.01)

(58) Field of Classification Search
CPC .. H02M 7/53871; H02M 1/08; H02M 1/0009; H02P 27/06; G01R 19/00; H03K 17/08122; H03K 17/687
See application file for complete search history.

(56) References Cited

U.S. PATENT DOCUMENTS

| | | | |
|---|---|---|---|
| 2013/0063123 A1* | 3/2013 | Liang | H03K 17/687 323/313 |
| 2013/0241621 A1* | 9/2013 | Forghani-Zadeh | H03K 17/08122 327/315 |
| 2016/0056818 A1* | 2/2016 | Kanda | H02P 27/06 318/504 |
| 2017/0155323 A1* | 6/2017 | Umemoto | H02M 1/08 |
| 2019/0097522 A1 | 3/2019 | Wada | |

FOREIGN PATENT DOCUMENTS

DE 11 2017 001 146 T5 11/2018

* cited by examiner

*Primary Examiner* — Kyle J Moody
*Assistant Examiner* — Jye-June Lee
(74) *Attorney, Agent, or Firm* — Crowell & Moring LLP

(57) ABSTRACT

A frequency converter having a shunt resistor for emitter shunt current measurement includes a drivable switch, which is interconnected and driven in such a way that it prevents an undesired current flow via a bootstrap capacitor and the shunt resistor.

6 Claims, 2 Drawing Sheets

FREQUENCY CONVERTER WITH DRIVABLE SWITCH PREVENTING UNDESIRED CURRENT FLOW

BACKGROUND AND SUMMARY OF THE INVENTION

The invention relates to a frequency converter having emitter-side current measurement using a shunt resistor.

The invention is based on the object of providing a frequency converter having emitter-side current measurement using a shunt resistor which improves the accuracy of the current measurement in relation to the prior art.

The invention achieves this object by means of a frequency converter according to the claimed invention.

The frequency converter conventionally comprises a number of bridge branches.

A respective bridge branch comprises a first power semiconductor, for example in the form of an IGBT. The first power semiconductor comprises a first terminal, a second terminal and a control terminal.

The first power semiconductor is electrically connected to a first electrical conductor at its first terminal, at which first electrical conductor a positive link circuit potential, which in particular is substantially constant over time, is present during operation of the frequency converter.

A respective bridge branch further comprises a second power semiconductor, for example in the form of an IGBT, wherein the second power semiconductor, like the first power semiconductor, comprises a first terminal, a second terminal and a control terminal.

The second terminal of the first power semiconductor is electrically connected to the first terminal of the second power semiconductor at a center tap of the bridge branch.

A respective bridge branch further comprises a shunt resistor for current measurement, wherein the shunt resistor is looped in between the second terminal of the second power semiconductor and a second electrical conductor, at which a negative link circuit potential, which in particular is substantially constant over time, is present during operation of the frequency converter.

A respective bridge branch further comprises a first driver component. The first driver component comprises a first voltage supply terminal and a second voltage supply terminal, wherein a supply voltage having a suitable level is applied between the first voltage supply terminal and the second voltage supply terminal. The first driver component further comprises an input terminal and an output terminal. The output terminal is electrically connected to the control terminal of the first power semiconductor. At the output terminal, depending on a control signal applied to the input terminal, a driver signal having a suitable level is output, the state of which determines whether the first power semiconductor is turned on or turned off. A bootstrap capacitor is looped in between the first voltage supply terminal and the second voltage supply terminal of the first driver component. With regard to these features, reference should moreover also be made to the relevant prior art.

A respective bridge branch further comprises a second driver component. The second driver component, in a manner corresponding to the first driver component, comprises a first voltage supply terminal and a second voltage supply terminal, wherein a supply voltage having a suitable level is applied between the first voltage supply terminal and the second voltage supply terminal. The second driver component further comprises an input terminal and an output terminal, which is electrically connected to the control terminal of the second power semiconductor. At the output terminal, depending on a control signal applied to the input terminal, a drive signal having a suitable level is output, the state of which determines whether the second power semiconductor is turned on or turned off. With regard to these features, reference should moreover also be made to the relevant prior art.

The frequency converter or at least one bridge branch of the frequency converter further comprises a drivable switch, for example in the form of a FET, which has an open state and a closed state depending on driving. The drivable switch is interconnected in such a way that in its open state it prevents a current flow via the bootstrap capacitor and the shunt resistor. According to the invention, all the bridge branches of the number of bridge branches can comprise a drivable switch of this type. Alternatively, a common switch can be provided, which is interconnected and driven in such a way that it prevents a respective current flow via the respective bootstrap capacitor and the respective shunt resistor.

In accordance with one embodiment, a respective bridge branch further comprises a decoupling diode, wherein the drivable switch is looped in between a feed voltage terminal, at which a positive feed voltage, which in particular is substantially constant over time, is present during operation of the frequency converter, and the anode of the decoupling diode, wherein the bootstrap capacitor comprises a first terminal, which is electrically connected to the first voltage supply terminal of the first driver component and the cathode of the decoupling diode, and wherein the bootstrap capacitor comprises a second terminal, which is electrically connected to the second voltage supply terminal of the first driver component and the center tap.

In accordance with one embodiment, the feed voltage has a level that is in a range of between 12 V and 36 V. Preferably the level of the feed voltage is 24 V.

In accordance with one embodiment, the feed voltage terminal is electrically connected to the first electrical conductor, i.e. the feed voltage corresponds to a potential difference between the positive link circuit potential and a reference potential.

In accordance with one embodiment, the drivable switch is driven in such a way that, during the current measurement by means of the shunt resistor, it prevents a current flow via the bootstrap capacitor and the shunt resistor to the second electrical conductor.

It goes without saying that more than two power semiconductors and associated driver components can also be present.

In accordance with one embodiment, the number of bridge branches is exactly three.

The invention is described in detail below with reference to the drawings.

DETAILED DESCRIPTION OF THE DRAWINGS

Figure 1:
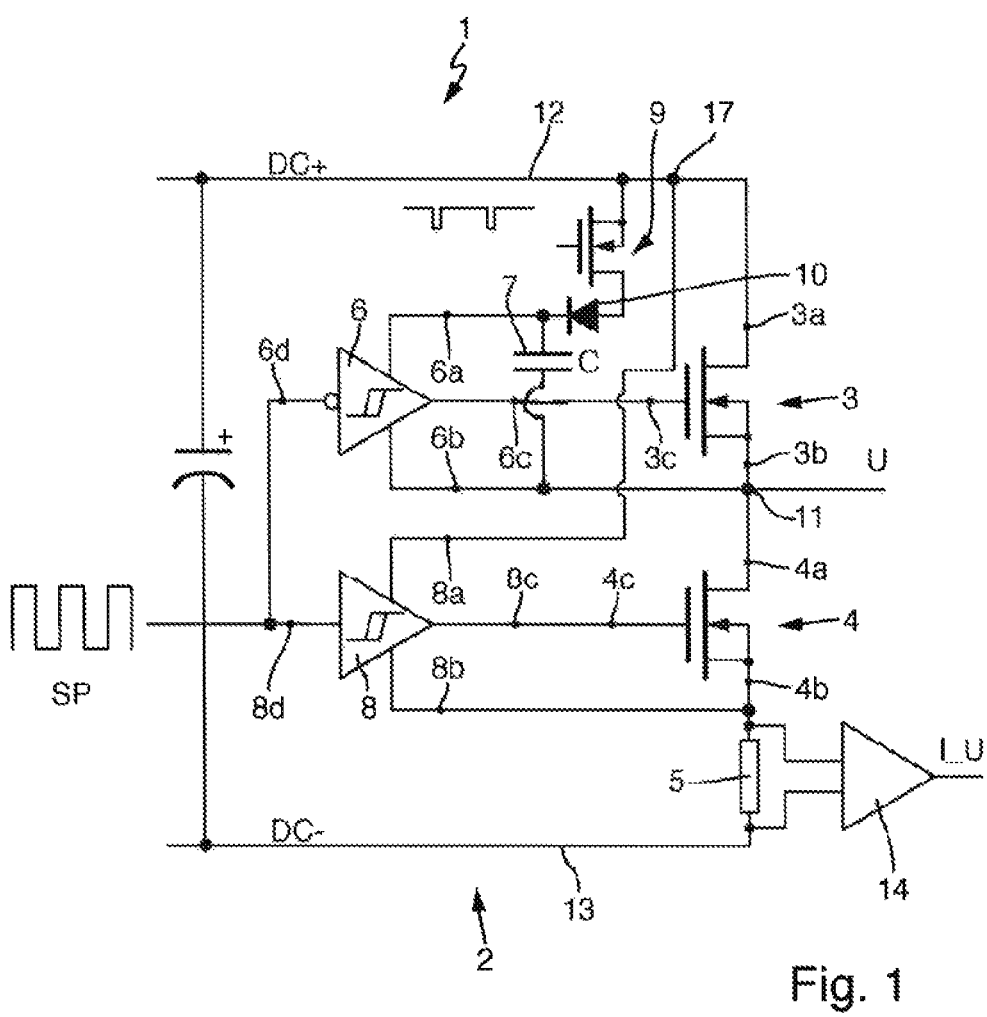
FIG. 1 shows a frequency converter according to the invention in accordance with a first embodiment.

FIG. 1 shows a frequency converter 1 in accordance with a first embodiment having three bridge branches 2, just a single bridge branch 2 of the total of three bridge branches being illustrated, for illustration reasons. The bridge branches not illustrated are constructed in a corresponding manner. The three bridge branches generate for example drive signals for a three-phase motor.

The bridge branch 2 illustrated by way of example comprises a first power semiconductor 3, for example in the form of an IGBT. The first power semiconductor 3 comprises a first terminal 3a, a second terminal 3b and a control terminal 3c, wherein the first power semiconductor 3 is electrically connected to a first electrical conductor 12 at its first terminal 3a, at which first electrical conductor a positive link circuit potential DC+ is present during operation of the frequency converter 1.

The bridge branch 2 illustrated by way of example further comprises a second power semiconductor 4, for example likewise in the form of an IGBT. The second power semiconductor 4 comprises a first terminal 4a, a second terminal 4b and a control terminal 4c, wherein the second terminal 3b of the first power semiconductor 3 is electrically connected to the first terminal 4a of the second power semiconductor 4 at a center tap 11 of the bridge branch 2.

The bridge branch 2 illustrated by way of example further comprises a shunt resistor 5 for current measurement, wherein the shunt resistor 5 is looped in between the second terminal 4b of the second power semiconductor 4 and a second electrical conductor 13, at which a negative link circuit potential DC− is present during operation of the frequency converter 1. The voltage dropped across the shunt resistor 5 is amplified by means of a differential amplifier 14 and then evaluated in a conventional manner for current measurement.

The bridge branch 2 illustrated by way of example further comprises a first driver component 6. The first driver component 6 comprises a first voltage supply terminal 6a and a second voltage supply terminal 6b, an input terminal 6d and an output terminal 6c, which is electrically connected to the control terminal 3c of the first power semiconductor 3, wherein a bootstrap capacitor 7 is looped in between the first voltage supply terminal 6a and the second voltage supply terminal 6b of the first driver component 6.

The bridge branch 2 illustrated by way of example further comprises a second driver component 8. The second driver component 8 comprises a first voltage supply terminal 8a and a second voltage supply terminal 8b, an input terminal 8d and an output terminal 8c, which is electrically connected to the control terminal 4c of the second power semiconductor 4. The first voltage supply terminal 8a is electrically connected to the first electrical conductor 12, and the second voltage supply terminal 8b is electrically connected to the second terminal 4b of the second power semiconductor 4.

Control pulses SP for driving the power semiconductors 3 and 4 are generated in a conventional manner by a control unit (not illustrated). The control pulses SP are applied to the input 8d of the driver component 8 and, in inverted fashion, to the input 6d of the driver component 6.

The components described up to this juncture are known from the prior art with regard to their properties and interconnection; therefore, with regard to their fundamental functions, reference should also be made to the relevant technical literature.

According to the invention, the bridge branch 2 illustrated by way of example comprises a drivable switch 9, for example in the form of a FET, which is interconnected and driven in such a way that, during a current measurement based on an evaluation of a voltage dropped across the shunt resistor 5, it prevents an undesired current flow from the first electrical conductor 12 via the bootstrap capacitor 7, the second power semiconductor 4 and the shunt resistor 5 to the second electrical conductor 13.

For this purpose, the bridge branch 2 illustrated by way of example further comprises a decoupling diode 10, wherein the drivable switch 9 is looped in between a feed voltage terminal 17 on the first electrical conductor 12 and the anode of the decoupling diode 10. The bootstrap capacitor 7 comprises a first terminal, which is electrically connected to the first voltage supply terminal 6a of the first driver component 6 and the cathode of the decoupling diode 10, and the bootstrap capacitor 7 comprises a second terminal, which is electrically connected to the second voltage supply terminal 6b of the first driver component 6 and the center tap 11.

Figure 2:
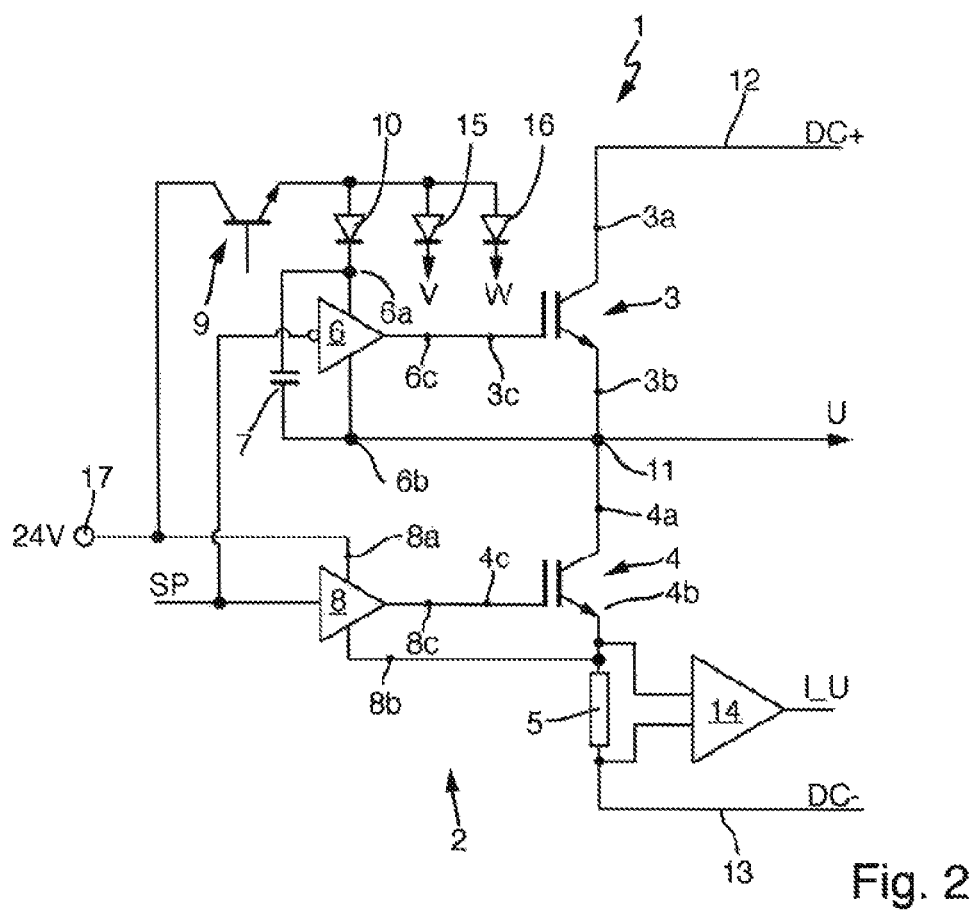
FIG. 2 shows a frequency converter according to the invention in accordance with a further embodiment.

FIG. 2 shows a frequency converter 1 according to the invention in accordance with a further embodiment.

The frequency converter shown in FIG. 2 differs from the frequency converter shown in FIG. 1 in that the feed voltage terminal 17 is not electrically connected to the first electrical conductor 12, but rather is electrically connected to a 24 V DC voltage supply. Decoupling diodes 15 and 16 are also illustrated by way of example, which are electrically coupled to bridge branches (not illustrated) for phases V and W.

For the rest, the frequency converter shown in FIG. 2 corresponds to the frequency converter shown in FIG. 1.

According to the invention, with the use of the emitter shunt current measurement, the accuracy of the current measurement in a frequency converter is improved.

By virtue of the fact that the lower power semiconductor or IGBT 4 is switched on in during the current measurement, without the use of the switching means 9 according to the invention, in addition to the motor current that is actually to be measured, a bootstrap current also flows via the bootstrap capacitor 7 and the second power semiconductor 4 through the shunt resistor 5, which results in a current measurement error. The measurement error is particularly large in the case of narrow drive pulses of the lower IGBT 4 since a high recharging current flows into the bootstrap capacitor 7, which becomes apparent as a measurement error at the shunt resistor. This effect becomes apparent to a particularly pronounced degree in the case of frequency converters having low motor currents, in particular, since the ratio of bootstrap current/motor current is greater.

The invention achieves the effect of suppressing said bootstrap current, with the result that only the motor current of interest flows via the shunt resistor 5.

According to the invention, the bootstrap current is controlled by addition of the switching means 9 in such a way that the bootstrap current is interrupted during the current measurement phase. By virtue of the fact that the charging of the bootstrap capacitor 7 is prevented synchronously with the current measurement (or sample), only the actual motor current without the bootstrap current is measured in the emitter-side shunt resistor 5.

The switching means 9 is driven for example with pulses obtained depending on sample pulses that control sampling of the voltage dropped across the shunt resistor 5.

What is claimed is:

1. A frequency converter, comprising:
   a number of bridge branches, wherein a respective bridge branch comprises:
   a first power semiconductor, wherein the first power semiconductor comprises a first terminal, a second terminal and a control terminal, wherein the first power semiconductor is electrically connected to a first electrical conductor at the first terminal of the first power semiconductor, where a positive link circuit potential is present at the first electrical conductor during operation of the frequency converter, a second power semiconductor, wherein the second power semiconductor comprises a first terminal, a second terminal and a control terminal, wherein the second terminal of the first power semiconductor is electrically connected to the first terminal of the second power semiconductor at a center tap of the respective bridge branch, a shunt resistor for current measurement, wherein the shunt resistor is looped in between the second terminal of the second power semiconductor and a second electrical conductor, where a negative link circuit potential is present at the second electrical conductor during operation of the frequency converter, a first driver component comprising:

a first voltage supply terminal and a second voltage supply terminal, an input terminal, and an output terminal, which is electrically connected to the control terminal of the first power semiconductor, wherein a bootstrap capacitor is looped in between the first voltage supply terminal and the second voltage supply terminal of the first driver component, and a second driver component, comprising:

a first voltage supply terminal and a second voltage supply terminal, an input terminal, and an output terminal, which is electrically connected to the control terminal of the second power semiconductor, wherein the frequency converter further comprises:

a drivable switch, which is interconnected such that in an open state a current is prevented from flowing via the bootstrap capacitor and the shunt resistor to the second electrical conductor.

2. The frequency converter according to claim 1, wherein a respective bridge branch further comprises:

a decoupling diode, wherein the drivable switch is looped in between a feed voltage terminal, at which a positive feed voltage is present during operation of the frequency converter, and an anode of the decoupling diode, wherein the bootstrap capacitor comprises a first terminal, which is electrically connected to the first voltage supply terminal of the first driver component and a cathode of the decoupling diode, and wherein the bootstrap capacitor comprises a second terminal, which is electrically connected to the second voltage supply terminal of the first driver component and the center tap.

3. The frequency converter according to claim 2, wherein the feed voltage has a level that is in a range of between 12 V and 36 V.

4. The frequency converter according to claim 2, wherein the feed voltage terminal is electrically connected to the first electrical conductor.

5. The frequency converter according to claim 1, wherein the drivable switch is driven such that, during the current measurement, a current is prevented from flowing via the bootstrap capacitor and the shunt resistor to the second electrical conductor.

6. The frequency converter according to claim 1, wherein the number of bridge branches is three.

* * * * *